Jan. 26, 1971  K. KIRCHHOFF  3,558,225
OPTICAL PHOTO OPPOSING APPARATUS
Filed May 17, 1968  6 Sheets-Sheet 1

INVENTOR.
Kurt Kirchhoff
BY
Beaman & Beaman
attys

Jan. 26, 1971     K. KIRCHHOFF     3,558,225
OPTICAL PHOTO OPPOSING APPARATUS
Filed May 17, 1968     6 Sheets-Sheet 2
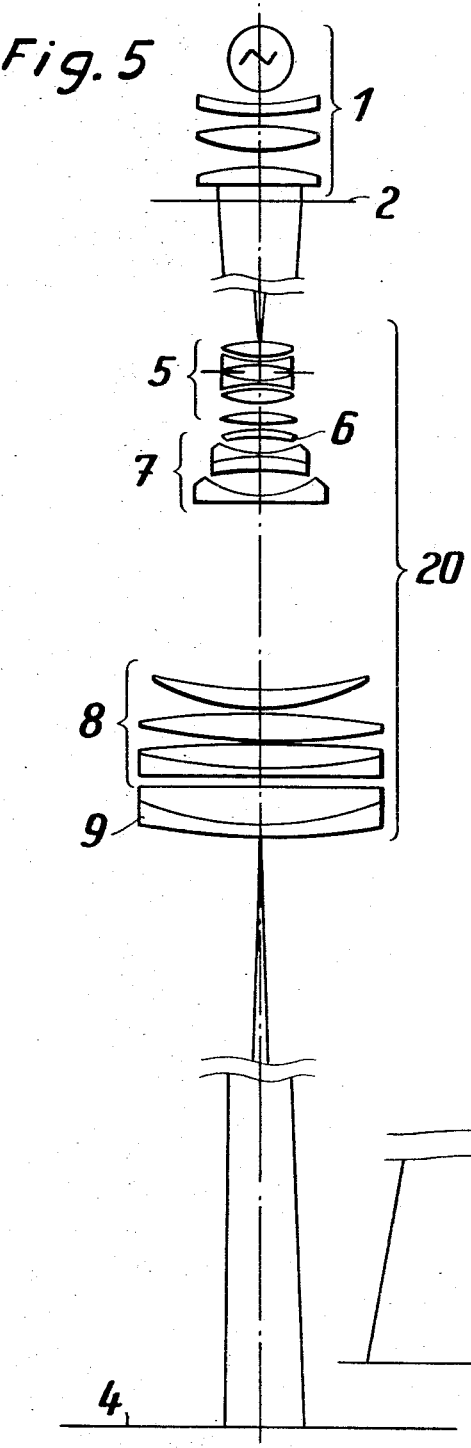
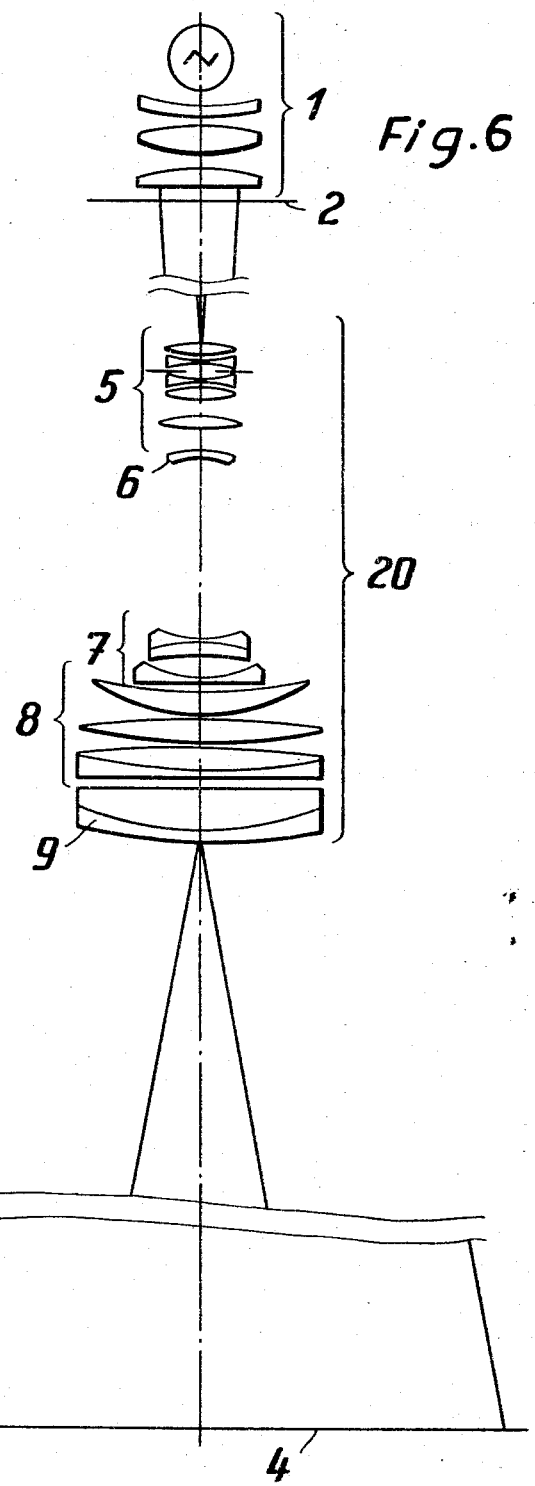
INVENTOR.
Kurt Kirchhoff
BY Beaman & Beaman
attys Jan. 26, 1971 K. KIRCHHOFF 3,558,225
OPTICAL PHOTO OPPOSING APPARATUS
Filed May 17, 1968 6 Sheets-Sheet 3
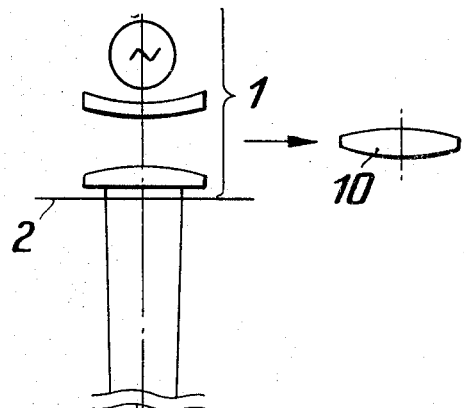
*Fig.7*
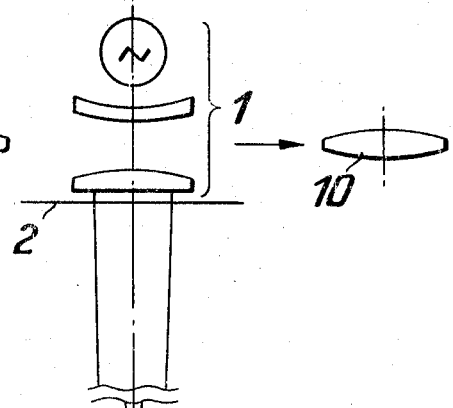
*Fig.8*
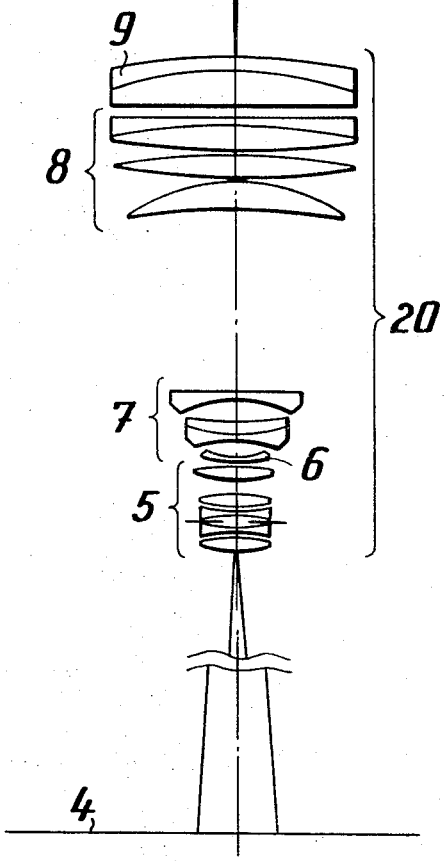
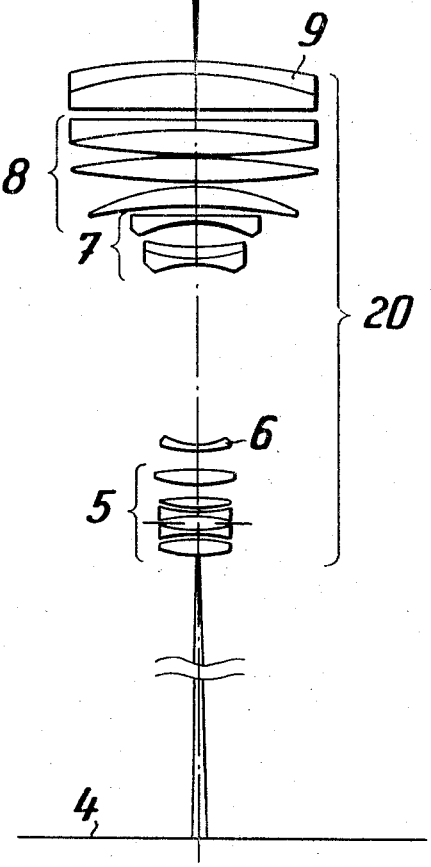
INVENTOR.
Kurt Kirchhoff
BY
Beaman & Beaman
Attys Jan. 26, 1971  K. KIRCHHOFF  3,558,225
OPTICAL PHOTO OPPOSING APPARATUS
Filed May 17, 1968  6 Sheets-Sheet 5

INVENTOR.
Kurt Kirchhoff
BY
Beaman & Beaman
Attys

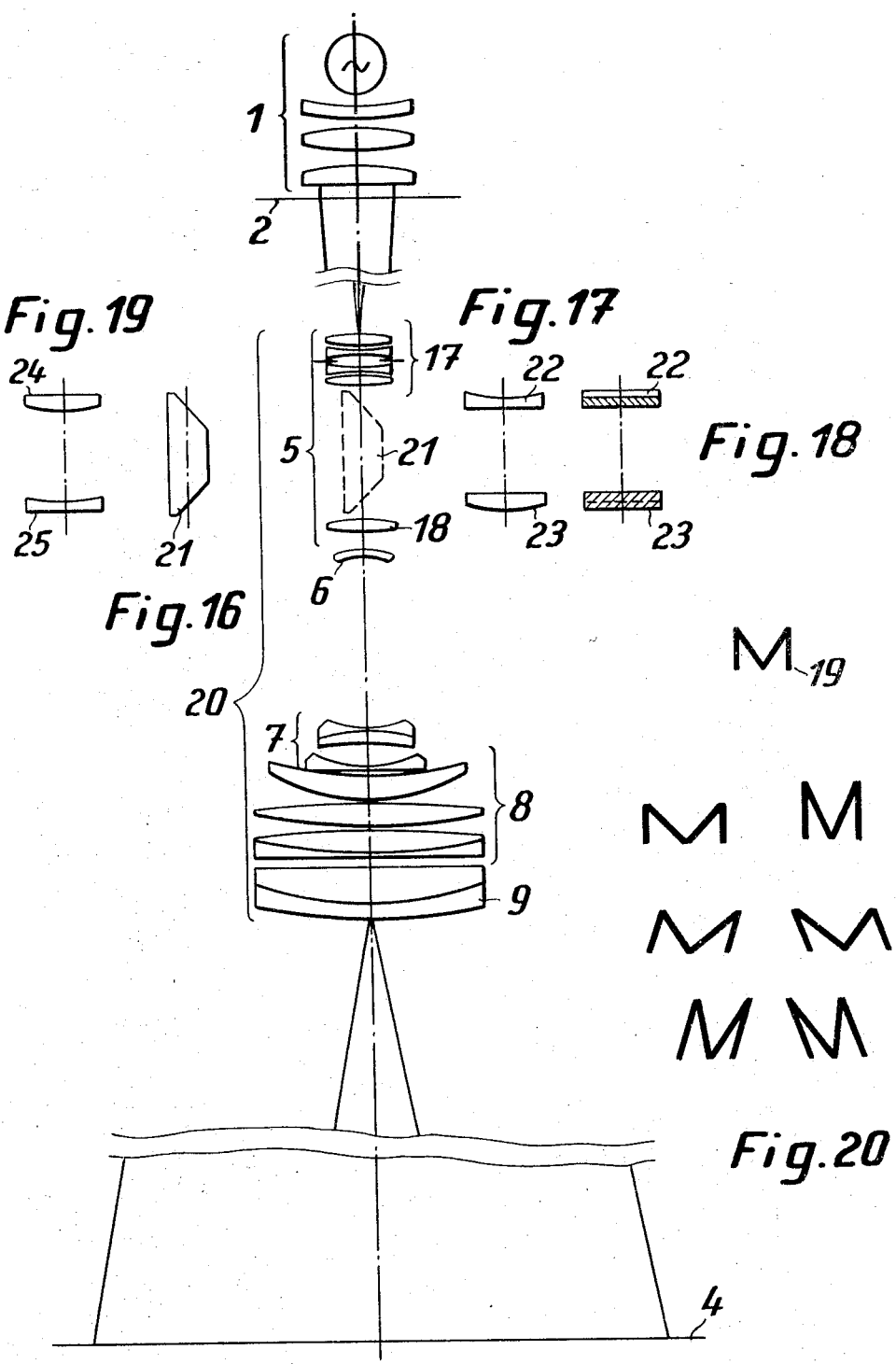

United States Patent Office 3,558,225
Patented Jan. 26, 1971

3,558,225
OPTICAL PHOTO OPPOSING APPARATUS
Kurt Kirchhoff, 45 Luttkamp, 53 Hamburg, Germany
Filed May 17, 1968, Ser. No. 730,123
Claims priority, application Germany, May 22, 1967,
1,572,314
Int. Cl. G03b 27/68
U.S. Cl. 355—52                                                     11 Claims

ABSTRACT OF THE DISCLOSURE

The optical photo opposing apparatus contains a composite objective which produces image types in an enlarged or reduced scale. A constant distance between type plane and image plane and simultaneous sharp focusing with image size variation simplifies operation of the apparatus. The enlargement and reduction range is broadened by swiveling the objective through 180 degrees. Additional optical means can be inserted into an air space in the path of rays in the objective whereby modification, especially distortion or rotation of the imaged types with respect to the original types, can be obtained.

BACKGROUND OF THE INVENTION

The invention relates to an optical photo opposing apparatus as is used for the production of inscriptions and texts in advertisement originals for the graphical design of advertisements, placards, etc.

A commercial artist preparing originals for these purposes would like to have at his disposal the greatest possible selection of different kinds and sizes of types.

An optical photo opposing apparatus with a selection of disc-shaped or strip-shaped type plates in the manner of photographic negatives allows him to dispense with the manually printed originals of the texts and affords him greater freedom in the design of the text. According to the principle of the photographic enlarger, the types of the alphabet are individually brought to the desired size and after composed to form texts are copied side by side on photographic paper.

The optical enlargement principle used in known optical photo opposing apparatuses and with known enlargers is based upon the fact that the image and/or the letters are brought to the desired size by variation of the distance with subsequent or automatic focusing.

With the variation of the image size of the letters, which normally is possible at least in an extent of 40 to 50 times, the optical photo opposing apparatus, exactly as is the case with an enlarger, must be permanently varied in its distance between the type plate plane and the image plane and the range of enlargement must additionally be broadened by the use of enlarging objectives of different focal length.

SUMMARY OF THE INVENTION

It is the object of the invention to provide an optical photo opposing apparatus wherein the image size may be varied in a simple manner practically not disturbing the operator and which at the same time allows for an especially large range of variation. The invention also aims at the provision of an optical photo opposing apparatus which allows for an additional deformation of the imaged types in an optical manner.

The optical photo opposing apparatus is essentially characterized in that the plane of the type plate and the image plane are fixedly arranged in their position with respect to each other, that the objective consists of a Vario system (zoom lens) wherein the focal length may be varied in a manner known per se by axial displacement of a first part of the system, while simultaneously maintaining a stationary position of the focal plane by axial displacement of a second part of the system, and that the Vario system arranged between the type plate plane and the image plane may be turned through 180 degrees with respect to the light beam.

With the apparatus formed in accordance with the invention, sharp focusing of the image is retained in spite of variation in the size of the image. The Vario system is constructed in such a manner that the desired variation by reduction or enlargement of the size of the letters is obtained simply by rotation of a single adjusting ring, without the necessity of subsequent sharp resetting.

The advantages of such an arrangement, on the one hand, lie in that the apparatus may be given a solid compact design which differs advantageously from the known optical photo opposing apparatuses used as enlargers and that the extension of the lamp housing with type plate and the operating mechanism thereof as well as the adjusting mechanism of the objective are dispensed with. Furthermore, the apparatus according to the invention also dispenses with the provision for an adaptation of curves necessary for the automatic sharp focusing which, with the previously used three objectives with different focal lengths had to be carried out three times.

A further advantage of the apparatus of the invention result from the fact that the operating mechanisms necessary for the adjustment of the type plate now may be arranged near the working plane. Accordingly, the operation of the apparatus has become simpler, quicker and safer. It is no longer necessary for the operator with the selection of the letters to adjust the operating buttons for the type plate with the arm outstretched up to a length of 1 m., or to effect thereby effect focusing. All circumstantial changes of objectives are eliminated. The focus control is effected only once when assembling the apparatus. The sizes of the letters are to be taken from an engraving arranged on the adjusting ring of the optical system, to be selected and to be set.

BRIEF DESCRIPTION OF THE DRAWINGS

FIG. 5 shows an embodiment of the optical Vario system constructed in accordance with the invention in the position with the enlargement factor 1, FIG. 6 shows the Vario system of FIG. 5, however, in the position of maximum enlargement, for example 7.5 times, FIG. 7 shows the Vario system of FIGS. 5–6 but turned through 180 degrees with the individual parts of the Vario system in the position of FIG. 5 so that here, too, the enlargement factor is 1, FIG. 8 shows the Vario system of FIG. 7 but in a position of an enlargement factor of 0.133, i.e., the position of the maximum reduction, for example 7.5 times.

3

Figure 14:
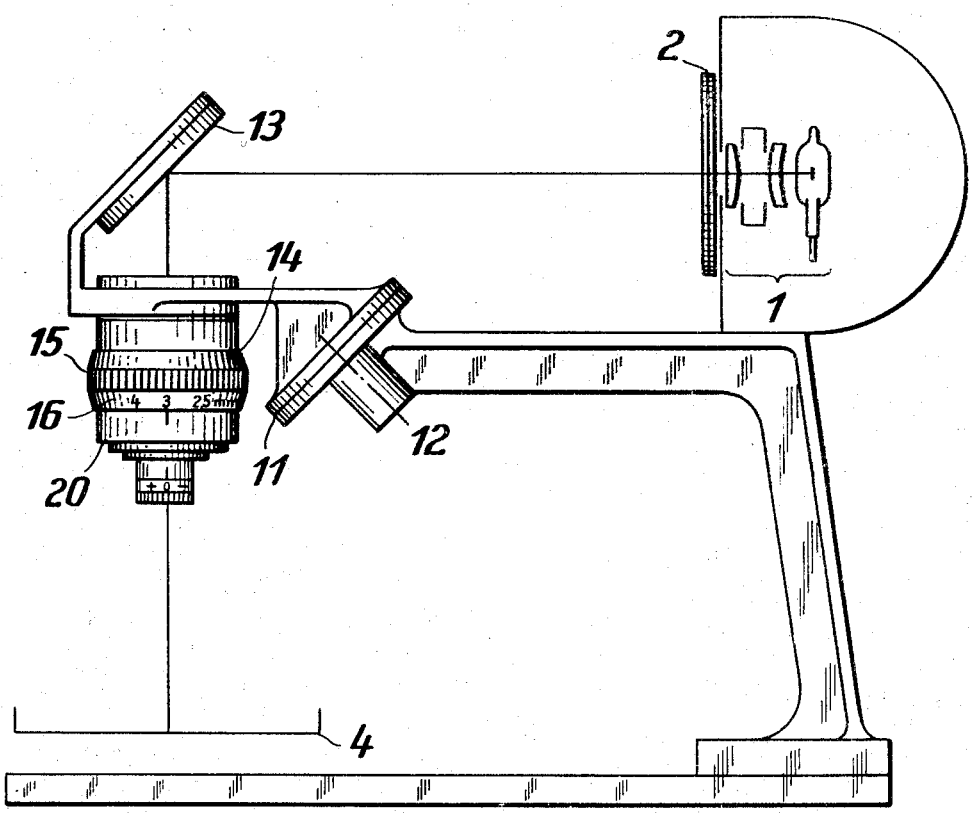
Figure 11:
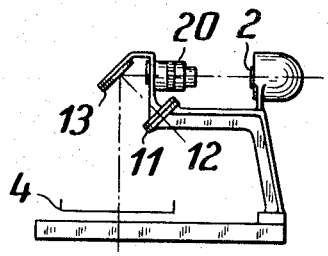
Figure 12:
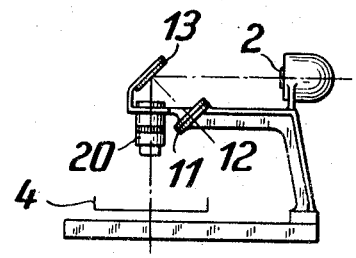
Figure 13:
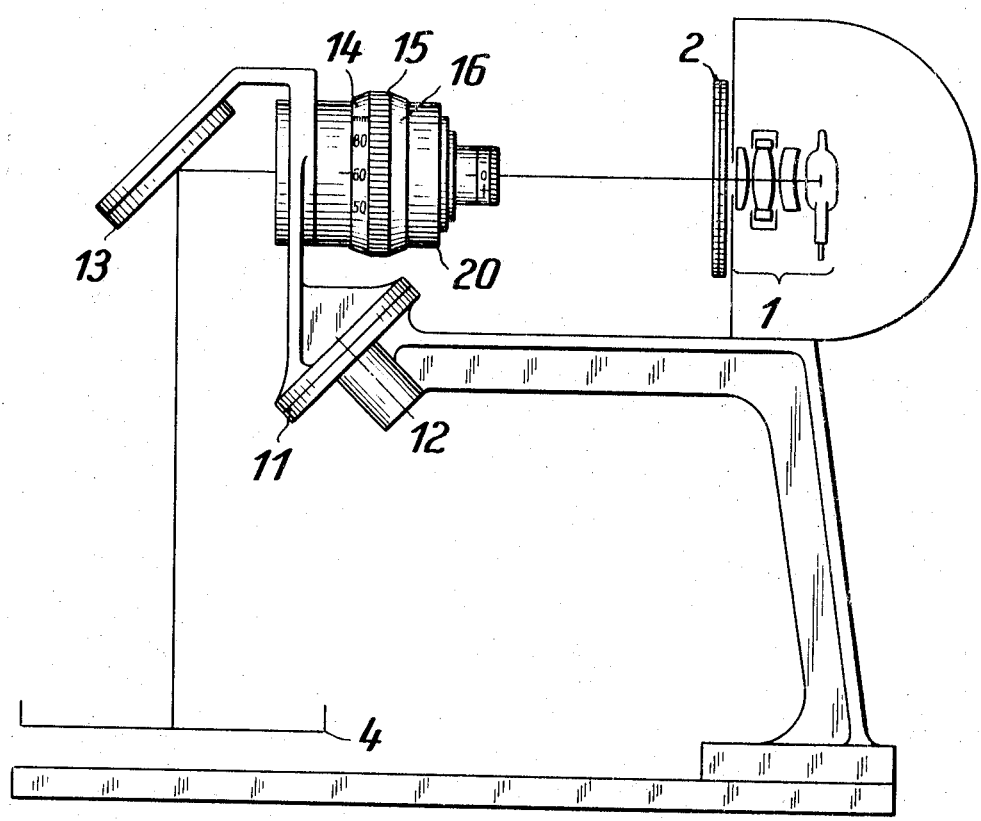

FIG. 11 is a diagrammatic representation of another embodiment of the invention, with the Vario system in the same position as described in FIGS. 5-6, FIG. 12 shows the optical photo opposing apparatus of FIG. 11, but with the Vario system in the position which has been explained in FIGS. 7-8, FIG. 13 shows the optical photo opposing apparatus as in FIGS. 11 and 12 in the same position as in FIG. 11 in an enlarged scale, FIG. 14 shows the optical photo opposing apparatus as in FIGS. 11 and 12 in the same position as in FIG. 12 in an enlarged scale, FIG. 15 shows another embodiment of a Vario system for carrying out the invention but with a broader air space with telecentric ray path between two lenses in the multiple-lens convergent part of the system adapted for replaceably inserting additional optical means, FIG. 16 shows a Dove prism as an example for a direct-vision prism which may be inserted into the air space with telecentric ray path of the Vario system of FIG. 15, FIG. 17 shows a view of a telescopic anamorphotic system consisting of two cylindrical lenses, which may be selectively inserted into the air space with telecentric ray path of the Vario system of FIG. 15, FIG. 18 shows a cross sectional view of the two cylindrical lenses of FIG. 17 along a plane which is disposed vertically with respect to the plane of the drawing of FIG. 17, FIG. 19 shows the telescopic combination of two spherical lenses which may be inserted into the air space with telecentric ray path of the Vario system of FIG. 15, FIG. 20 shows the distorting effect of an anamorphotic system constructed according to FIGS. 17-18, for example, when inserted into the air space with telecentric ray path of the Vario system of FIG. 15 and with rotation of this telescopic anamorphotic system about the optical axis.

DESCRIPTION OF THE PREFERRED EMBODIMENTS

Figure 1:
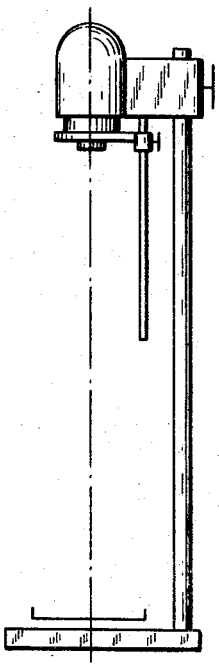
FIG. 1 shows a view of a known optical photo opposing apparatus adjusted for enlargement.
Figure 2:
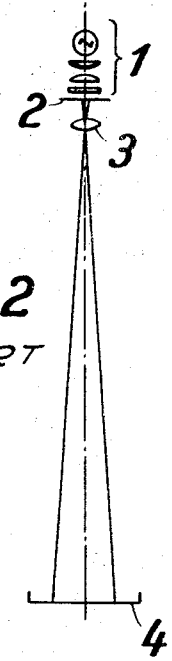
FIG. 2 shows the system of lenses and the ray tracing in the apparatus of FIG. 1.
Figure 3:
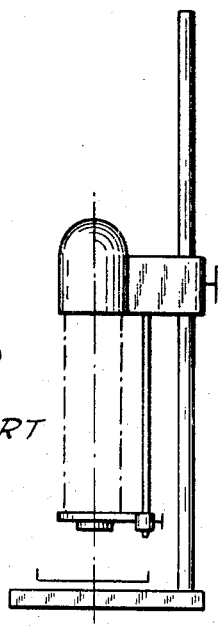
FIG. 3 shows a view of a known optical photo opposing apparatus adjusted for reduction.
Figure 4:
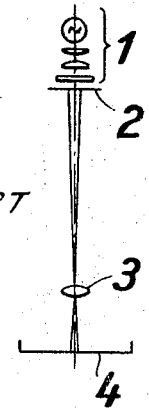
FIG. 4 shows the system of lenses and the ray tracing in the apparatus of FIG. 3.

In the known optical photo opposing apparatuses shown in FIGS. 1 to 4 a section of a type plate 2 is illuminated by means of a light projector 1 and is imaged by an objective 3 in the image plane 4. In FIGS. 1, 2 the original type is imaged in an enlarged scale and in FIGS. 3, 4 the original type is imaged in a reduced scale.

In accordance with FIG. 5, the light projector system 1 illuminates a section of a type plate 2 which is imaged by an objective 20 formed as a Vario system in the image plane 4.

The represented objective 20 is a multiple-lens Vario system with a focal length variability of, in this case, about 7.5 times, which in this embodiment is obtained by an axial displacement of divergent parts of the system. It consists of a stationarily mounted convergent part 5 of the system comprising in this case, of five lenses; the displaceable one-lens divergent part 6 of the system; a displaceable divergent part 7 of the system comprising in this embodiment 3 lenses; a stationarily mounted convergent part 8 of the system comprising in this case, 4 lenses; and a convergent part 9 of the system, in this case, having two lenses, which permits a slight displacement for sharp focusing.

In FIGS. 5 to 8 the ray paths of the projection rays are interrupted for space saving purposes.

As will be seen from the image rays in FIGS. 5, the optical system in this position gives a single enlargement.

To shorten the focal length in order to obtain an enlarged image, the divergent part 7 of the system is displaced downwardly.

The sharp focusing is then effected by a relatively minor displacement of the divergent lens 6.

With the greatest possible downward displacement of the part 7 of the system, which is shown in FIG. 6, the

4 optical system then will have a 7.5 times enlargement, with the distance between the plane 1 of the type plate and the image plane 4 remaining unchanged.

This principle of variable displacement of two divergent optical parts in a Vario system for changing the focus length with simultaneous maintaining the position of the focal plane unchanged is known per se in connection with zoom lens objectives for film and television.

In this case, the divergent part 7 of the system has the function of a focal length variator means.

Its movement is performed with the aid of a screw (not shown) while the divergent part 6 of the system moves on a curve (not shown) which mostly is a curve with reversal point, the points of the curve shape are calculated to be such that a complete consistancy of the position of the image plane is guaranteed.

It is also within the concept of the invention to effect the change in focal length and likewise the necessary focus control with a corresponding lens arrangement of the optical system 20 by displacement of the convergent parts.

The single enlargement obtained with the position shown in FIG. 5 has increased to an enlargement factor of 7.5 in FIG. 6.

In accordance with the invention, now, the position of the optical system 20 can be changed with respect to the arrangement in FIG. 5 in such a manner that the part 9 of the system is turned towards the type plate 2 and the part 5 of the system is turned towards the image plane 4, as is shown in FIG. 7.

In this case, the enlargement of the system is a single one as in FIG. 5.

The distance between the plane of the type plate 2 and the image plane 4 has remained unchanged.

The illuminating system has here been adapted to the increased distance of the entry aperture of the optical system 20 by swinging out the convergent lens 10.

If now as shown in FIG. 8 the divergent system 7 displaced upwardly, one will obtain a 0.133 times enlargement, i.e., a reduction with a reduction factor of 7.5. The range of variation of the image size thus in the present case is 7.5×7.5=56 times. That means that one may continuously enlarge a type which on the type plate 2 has a size of 100 mm., to 75 mm. and after reversing the optical system one may continuously reduce it to 1.33 mm. This 56 fold variation in size is obtained with one single optical system with the distance between the object plane and image plane remaining constant, and with the sharp focusing remaining the same. Of course, for special purposes one may also select systems with a range of alteration of 2×2, 5×5 or even 10×10 or any other ranges of variation, which may be desired.

In any case, one will obtain a squaring of the variation range if one designs the imaging relationships to be such that in one end position of this range of the optical system used, one obtains the enlargement 1. To carry out the invention, however, it is not necessary that in one end position of the focal length variation range of the Vario system the enlargement reaches the factor 1. But it is however, suitable that in one end position of the focal length variation range of the Vario system the enlargement approximately reaches the factor 1. It is possible, for example, to provide a gap in the focal length variation with turning the objective from one position into the other position or to provide an overlapping to occur in such a manner that in the one end position of the focal length range variation the enlargement is somewhat smaller or somewhat greater than 1.

Figure 9:
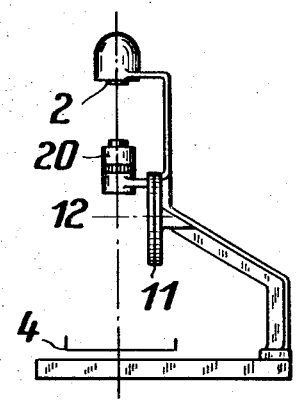
FIG. 9 shows the embodiment of the optical photo opposing apparatus in accordance with the invention, with the Vario system being in the position which has been described in FIGS. 5–6.
Figure 10:
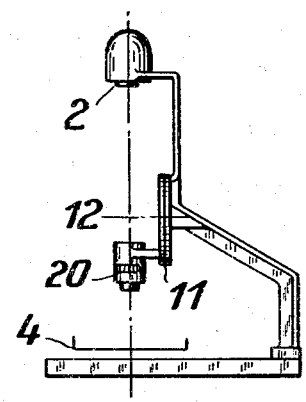
FIG. 10 shows the optical photo opposing apparatus of FIG. 9, but with the Vario system in the position which has been described in FIGS. 7–8.

In accordance with the embodiment shown in FIG. 9, the optical system 20 is in a position for enlargement on an adjusting member 11 formed as a rotary disc with the axis 12. In FIG. 10, the optical system 20 has been brought into the position of reduction by pivoting the rotary disc 11 about the axis 12. If care is taken that the axis 12 is on a level exactly midway between the type disc plane 2 and the image plane 4 the sharp focusing is necessary for only one position. When turned into the other position, focusing of the image will be positively given.

A still more favourable and more compact form of the inventive device is shown in FIGS. 11-12.

The ray tracing is deflected for example by 90°, by means of a surface mirror 13 disposed at an angle of 45°. The swivel axis of the adjusting member 11 is likewise arranged at an angle of 45°, thus bisecting the ray deflection angle of 90°. FIG. 11 shows the position of enlargement and FIG. 12 shows the position of reduction of the optical system.

In FIGS. 13 and 14, the apparatus is shown in more detail. FIG. 13 shows the principal ray tracing for an enlargement of a part of the type plate 2 illuminated through the light projector 1, said ray tracing running through the optical Vario system 20 via the mirror 13 to the image plane 4. The scale 14 on the one side of the adjusting ring 15 indicates the height of the enlarged images of the letters in millimeters. The optical system 20 is supported on the rotary disc 11 and may be turned about the axis 12 into the position of reduction.

This is shown in FIG. 14. Here, the part of a type plate 2 illuminated by the light projector 1 is imaged in the image plane 4 at a reduced scale via the mirror 13 and the optical Vario system 20. The scale 16 on the other side of the adjusting ring 15 indicates the height of the reduced images of the letters in mm.

The invention still offers further considerable advantages over the photo opposing apparatus constructed like enlargers.

As with the invention of the optical system has a fixed and invariable distance of the plane of the type plate and to the image plane, respectively, the optician may easily provide a broader air space between two lenses in the five lenses convergent part of the system shown as an example, and make the ray tracing in this air space telecentric. This construction has the great advantage that direct-vision prisms, Dove prisms for example, may be inserted in this air space with telecentric ray path in order to invert the image (to produce reflected face types) or to rotate the image (to obtain special type characters).

Likewise telescopic anamorphotic systems comprising cylinder lenses may be inserted to distort, or change the type character.

This broader air space with the telecentric ray path into which additional optical means may be inserted, may also be used to advantage in connection with a photo opposing apparatus which is stationarily mounted with respect to the image and object planes, that means the system of lenses cannot be turned around.

Because of the strong astigmatism occurring in the finite ray tracing in the axis, the insertion of Dove prisms and anamorphotic systems was possible in the prior art apparatuses only at the sacrifice of sharp focusing in spite of strongest stopping down and corresponding extension of the exposure time.

Of course, with this invention telescopic systems comprising spherical lenses may also be inserted in order to broaden the range of enlargement beyond the upper and lower limits.

These additional prisms, telescopic anamorphotics or normal telescopic systems which, in accordance with the invention can be inserted into the air space provided therefore, wherein the ray tracing is telecentric, do not call for any changes in distance, because the position of the focal plane is not influenced, contrary to the insertion of said additional means in the previous photo opposing apparatuses which are similar to enlargers. It is possible, of course, to arrange said additional optical means in the air space with telecentric ray path not only immovably but also movably, especially rotatably about the optical axis.

In FIG. 15, such an optical system is shown with a suitable air space.

The light projector system 1 illuminates the section of a type plate 2 which is imaged in the image plane 4 by the optical Vario system 20. The optical system 20 comprises a rigidly fitted convergent part 5, in this case comprising five lenses; a displaceable divergent part 6 having one lens in this case; a displaceable divergent part 7 comprising 3 lenses; a rigidly mounted convergent part 8 comprising four lenses; and a system part 9 comprising two lenses which permit slight displacement for focusing.

The system part 5 is subdivided into the system part 17 comprising four lenses, and the system part 18 comprising one lens, by the provided broad lens distance forming said air space.

Between these system parts 17 and 18 there may be selectively inserted the Dove prism shown in FIG. 16, the telescopic anamorphotic system consisting of the two cylindrical lenses 22, 23 which system is shown in an effective sectional view of its cylindrical lenses 22 in FIG. 17 and in an ineffective sectional view thereof in FIG. 18 or the telescopic spherical system of FIG. 19 comprising the two spherical lenses 24, 25.

In FIG. 20, the distorting effect on the type character by means of the inserted telescopic anamorphotic system 22, 23 is shown which was rotated about the optical axis. Letter M indicated by the reference number 19 is the original one without any distortion.

What I claim is:

1. Optical photo opposing apparatus comprising light projector means producing a light beam, swivel carrier means rotatably mounted at a fixed part of the apparatus, a composite objective mounted on said swivel carrier means with its optical axis in and parallel to said light beam and consisting of a system of lenses, said carrier means with said objective being selectively pivotable from a first enlargement position about 180 degrees into a second reduction position, a first part of said lens system in said objective being mounted for axial displacement and suited for variation of focal length, a second part of said lens system in said objective being mounted for axial displacement and suited for simultaneous sharp focusing, a third part of said lens system in said objective having provided between two lenses thereof an air space with telecentric ray tracing, original means to be copied displaceably arranged between said light projector means and said objective in said light beam in a plane substantially vertical to said beam, means for said original means to be imaged thereon and arranged in the objective focal plane at a constant distance from said plane of original means and optical means disposed adjacent said third part of said lens system to be inserted replaceably into said air space with telecentric ray tracing whereby a predetermined image modificaton in the image plane can be obtained.

2. Optical photo opposing apparatus according to claim 1, wherein said optical means is a direct-vision prism.

3. Optical photo opposing apparatus according to claim 1, wherein said optical means is a Dove prism.

4. Optical photo opposing apparatus according to claim 1, wherein said optical means is a telescopic anamorphotic system of lenses.

5. Optical photo opposing apparatus according to claim 1, wherein said optical means is a telescopic system comprising spherical lenses.

6. Optical photo opposing apparatus comprising, in combination, a frame, light projector means producing a light beam mounted on said frame, swivel carrier means rotatably mounted on said frame rotatable about a fixed axis, a composite objective mounted on said swivel carrier means having an optical axis aligned with said light beam and comprising a system of lenses, the system including first and second parts each mounted for axial displacement with respect to said optical axis for variation of objective focal length and for simultaneous sharp focusing, respectively, said carrier means and said objective capable of being rotated about said fixed axis from a first enlargement position with the light beam passing through the objective in one direction to a second reduction position with the light beam passing through the objective in the opposite direction, original holder means to hold the original to be copied mounted in said light beam between said light projector means and said objective, and image receiving means for said original to be imaged upon located at a constant distance from said original holder means.

7. Optical photo opposing apparatus as in claim 6 wherein said swivel carrier means fixed axis of rotation intersects said light beam to define equal angles at the intersection of said fixed axis and the light beam coming from said projector means on the one side and from the intersection of said fixed axis and the light beam extending to said image receiving means on the other side.

8. Optical photo opposing apparatus as in claim 6 wherein said swivel carrier means fixed axis of rotation intersects said light beam at a point spaced equidistant from both the original holder means and the image receiving means.

9. Optical photo opposing apparatus as in claim 6 wherein a mirror reflective surface is mounted on said swivel carrier means obliquely disposed to said light beam and the optical axis of the objective intersects with the fixed axis of rotation of said swivel carrier means on said mirror surface.

10. Optical photo opposing apparatus as in claim 6 wherein said swivel carrier means and said objective are rotated from a first enlargement position 180° about said fixed axis to a second reduction position.

11. Optical photo opposing apparatus as in claim 9 wherein said mirror surface reflects said light beam with a 90° deflection.

References Cited
UNITED STATES PATENTS 3,149,546  9/1964  Schulze _____ 355—66X
3,369,448  2/1968  Dacquay _____ 355—60

JOHN M. HORAN, Primary Examiner
R. A. WINTERCORN, Assistant Examiner

U.S. Cl. X.R.
355—57, 60, 65, 66